(12) United States Patent
Tanizawa et al.

(10) Patent No.: US 9,813,237 B2
(45) Date of Patent: Nov. 7, 2017

(54) RECEIVER, TRANSMITTER, COMMUNICATION SYSTEM, AND COMMUNICATION METHOD

(71) Applicant: Kabushiki Kaisha Toshiba, Minato-ku (JP)

(72) Inventors: Yoshimichi Tanizawa, Yokohama (JP); Akira Murakami, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 138 days.

(21) Appl. No.: 14/641,755

(22) Filed: Mar. 9, 2015

(65) Prior Publication Data

US 2016/0359625 A1    Dec. 8, 2016

(30) Foreign Application Priority Data

Mar. 18, 2014   (JP) .................. 2014-055222

(51) Int. Cl.
*H04L 9/08* (2006.01)
*H04B 10/70* (2013.01)

(52) U.S. Cl.
CPC ........... *H04L 9/0858* (2013.01); *H04B 10/70* (2013.01); *H04L 9/0855* (2013.01)

(58) Field of Classification Search
CPC ...... H04B 10/70; H04L 9/0858; H04L 9/0855
(Continued)

(56) References Cited

U.S. PATENT DOCUMENTS 7,734,757 B2    6/2010   Maeda et al.
2012/0328290 A1*  12/2012  Yuan .................. H04B 10/70
                                                      398/48

FOREIGN PATENT DOCUMENTS

EP     2485429 A2    8/2012
GB   2 405 294 A    2/2005
(Continued)

OTHER PUBLICATIONS

Bernd Fröhlich, et al., "A quantum access network", Nature, vol. 501, 69, Sep. 2013, 5 pages.
(Continued)

*Primary Examiner* — Kambiz Zand
*Assistant Examiner* — Aubrey Wyszynski
(74) *Attorney, Agent, or Firm* — Oblon, McClelland, Maier & Neustadt, L.L.P.

(57) ABSTRACT

According to an embodiment, a receiver is connected to transmitters through photon communication channels and data communication channels to generate identical cryptographic keys to be shared with each transmitter. The receiver includes a sharing unit, a key distilling unit, a data communication controller, and a calculator. The key sharing unit is configured to generate a shared bit string through quantum key distribution with each transmitter via a corresponding photon communication channel. The key distilling unit is configured to generate the cryptographic keys from the respective shared bit strings. The data communication controller is configured to receive from each transmitter first information about a corresponding cryptographic key via a corresponding data communication channel. The calculator is configured to calculate the photon timeslots based on at least the first information. The data communication controller is configured to transmit the photon timeslots to the transmitters.

15 Claims, 7 Drawing Sheets

(58) Field of Classification Search
USPC .......................................................... 380/256
See application file for complete search history.

(56) References Cited

FOREIGN PATENT DOCUMENTS

| | | |
|---|---|---|
| JP | 2004-336578 A | 11/2004 |
| JP | 2007-53591 A | 3/2007 |
| JP | 2008/154019 | 7/2008 |
| JP | 2013-13073 | 1/2013 |

OTHER PUBLICATIONS

Gerry Pesavento, et al., "IEEE Access Standards,802.3ah GE-PON Status", ITU-T Workshop IP/Optical, Jul. 9-11, 2002, 15 pages.
K. A. Patel, et al., "Coexistence of High-Bit-Rate Quantum Key Distribution and Data on Optical Fiber", Physical Review X 2, 041010, 2012, 8 pages.
Basic Technology lesson GE-PON DBA Function , NTT Technology Journal, 2005, 10, 4 pages.

\* cited by examiner

FIG.1
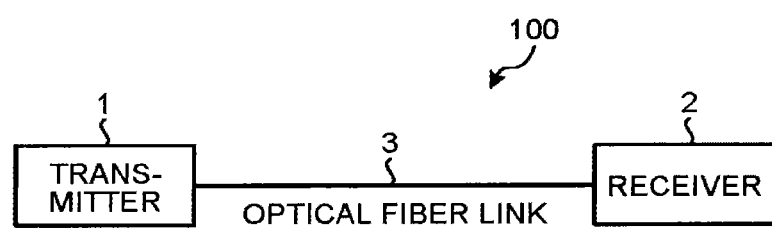
FIG.2
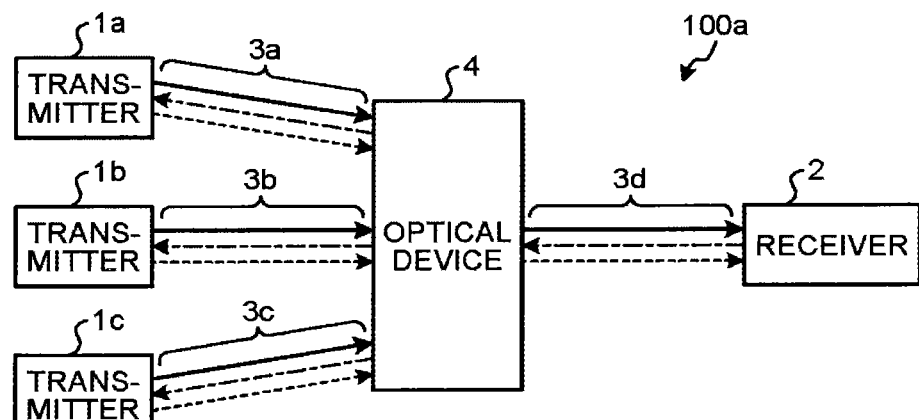
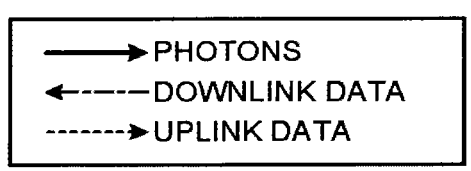

RECEIVER, TRANSMITTER, COMMUNICATION SYSTEM, AND COMMUNICATION METHOD

CROSS-REFERENCE TO RELATED APPLICATION

This application is based upon and claims the benefit of priority from Japanese Patent Application No. 2014-055222, filed on Mar. 18, 2014; the entire contents of which are incorporated herein by reference.

FIELD

Embodiments described herein relate generally to a receiver, a transmitter, a communication system, and a communication method.

BACKGROUND

A quantum key distribution system is configured with a transmitter, a receiver, and an optical fiber link that connects the transmitter and the receiver. The transmitter transmits photons to the receiver via the optical fiber link. Then, the transmitter and the receiver exchange control information with each other, and share a bit string in a confidential fashion for the purpose of generating cryptographic keys. This technology is implemented using the technology generally referred to as quantum key distribution (QKD).

Among such quantum key distribution systems, a system which is configured with a plurality of transmitters, a plurality of optical fiber links formed by branching by an optical device, and a single receiver; and in which the receiver receives photons from a plurality of transmitters via the optical device is called a quantum access network (QAN). As a network that has an identical network configuration to a QAN and that performs optical data communication, a passive optical network (PON) is known. In the optical data communication performed by a PON, there are two types of data, namely, data in the downlink direction (hereinafter, called downlink data) that is communicated from the receiver to the transmitters; and data in the uplink direction (hereinafter, called uplink data) that is communicated from the transmitters to the receiver. The downlink data and the uplink data is respectively transmitted via a downlink-direction optical data communication channel and an uplink-direction optical data communication channel that are multiplexed in the same optical fiber link using the wavelength division multiplex (WDM) technology.

The downlink data is broadcast from the receiver to a plurality of transmitters via the downlink-direction optical data communication channel. The downlink data contains a logical link IDs (LLID) that represents the ID of the destination transmitter. Hence, each transmitter that receives the downlink data refers to the LLID and determines whether the received data is meant for itself. As far as the uplink data is concerned, each transmitter transmits uplink data according to a timeslot (for example, a transmission start timing and a transmittable time period) that is assigned thereto from the receiver. As a result, each set of uplink data gets transmitted to the receiver in a time-shared manner without any collision in the optical fiber link. Moreover, in a PON, in the case in which the receiver assigns a timeslot to each transmitter, instead of implementing fixed bandwidth allocation (FBA) in which the allocation is done in a fixed manner, dynamic bandwidth allocation (DBA) is introduced in which the timeslots are allocated in a dynamic manner depending on the traffic of the uplink data transmitted by each transmitter. As a result, efficient optical data communication is achieved in the uplink direction.

In a QAN too, each transmitter transmits photons according to the timeslot assigned thereto from the receiver. However, unlike in a PON, dynamic allocation of timeslots has not been achieved in a QAN. Moreover, efficiency in sharing the cryptographic keys and using the cryptographic keys has also not been achieved. In a QAN, the timing of use and the amount of use of a shared cryptographic key differs according to the applications executed in the transmitters and the receiver. Hence, in the method in which fixed timeslots are assigned to a plurality of transmitters and photon transmission is done according to those timeslots, it is not possible to achieve efficiency in sharing the cryptographic keys and using the cryptographic keys.

BRIEF DESCRIPTION OF THE DRAWINGS

FIG. 1 is a diagram illustrating a configuration example of a communication system;

FIG. 2 is a diagram illustrating a configuration example of a communication system according to a first embodiment;

DETAILED DESCRIPTION

Figure 3:
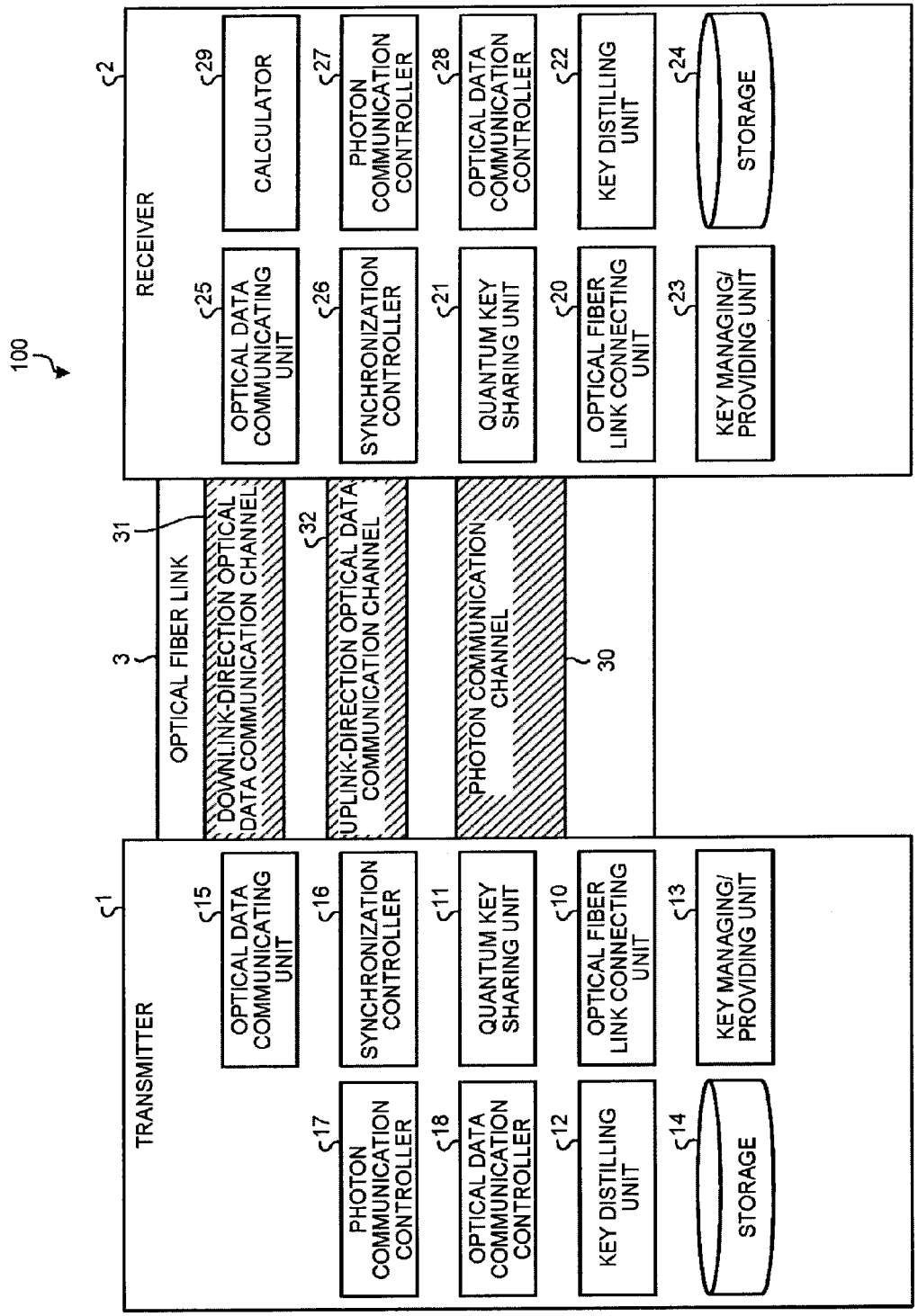
FIG. 3 is a diagram illustrating a block configuration of a transmitter and a receiver.

According to an embodiment, a receiver is connected to a plurality of transmitters through photon communication channels and data communication channels to generate cryptographic keys for the respective transmitters such that an identical cryptographic key is shared with the receiver and the concerned transmitter. The photon communication channels are used for receiving photon strings by time-division multiplexing performed using photon timeslots.

The data communication channels are used for performing data communication. The receiver includes a first quantum key sharing unit, a first key distilling unit, a first data communication controller, and a calculator. The first quantum key sharing unit is configured to generate a shared bit string through quantum key distribution with each of the transmitters via a corresponding photon communication channel. The first key distilling unit is configured to generate the cryptographic keys from the respective shared bit strings by a key distillation process. The first data communication controller is configured to receive from each of the transmitters first information indicating information about a corresponding cryptographic key via a corresponding data communication channel. The calculator is configured to calculate the photon timeslots based on at least the first information. The first data communication controller is configured to transmit the photon timeslots calculated by the calculator to the transmitters.

Exemplary embodiments of a receiver, a transmitter, a communication system, and a communication method according to the invention are described below in detail with reference to the accompanying drawings. In the accompanying drawings, the same constituent elements are referred to by the same reference numerals. However, the drawings are only schematic in nature, and the specific configuration should be determined by taking into account the explanation given below.

First Embodiment

FIG. 1 is a diagram illustrating a configuration example of a communication system. With reference to FIG. 1, a communication system 100 configured with a single transmitter and a single receiver is taken as an example, and the explanation is given with a focus on the functions of a transmitter, a receiver, and an optical fiber link.

As illustrated in FIG. 1, the communication system 100 includes a transmitter 1, a receiver 2, and an optical fiber link 3 (an optical communication path).

In the optical fiber link 3 of the communication system 100, the WDM technology can be implemented so as to form a photon communication channel for the purpose of communicating photons and to form an optical data communication channel for the purpose of optical data communication. Moreover, the optical communication path is further divided into a downlink-direction optical data communication channel that is used to transmit data from the receiver 2 to the transmitter 1 in the downlink direction, and an uplink-direction optical data communication channel that is used to transmit data from the transmitter 1 to the receiver 2 in the uplink direction. Thus, the communication system not only functions as a quantum key distribution system for generating cryptographic keys, but also functions as an optical-data communication network system for normal optical data communication. Meanwhile, for example, aside from the photon communication channel and the optical data communication channel, it is also possible to have separate channels such as a clock channel for the purpose of replacing the clock signal required in achieving synchronization between the transmitter 1 and the receiver 2.

For example, the transmitter 1 transmits, to the receiver 2 via the photon communication channel of the optical fiber link 3, a bit string (hereinafter, referred to as a photon bit string) that is made of single photons which are generated using random numbers and which serve as the basis for generating cryptographic keys. Moreover, the transmitter 1 performs a shifting process (described later), an error correction process (described later), and a key compression process (a privacy amplification process) (described later) based on the photon bit string that is transmitted; and generates a cryptographic key. Herein, the process by which the transmitter 1 transmits a photon bit string to the receiver 2 and the shifting process are particularly referred to as "quantum key distribution". Similarly, the error correction process and the key compression process (a privacy amplification process) are referred to as a "key distillation process". Meanwhile, the transmitter 1 transmits uplink data to the receiver 2 via the uplink-direction optical data communication channel of the optical fiber link 3, and receives downlink data from the receiver 2 via the downlink-direction optical data communication channel of the optical fiber link 3. Herein, the uplink data and the downlink data, which is communicated during optical data communication, can be control data required in quantum key distribution or the key distillation process or can be any other commonly-used data.

The receiver 2 receives, from the transmitter 1 via the photon communication channel of the optical fiber link 3, a photon bit string that is made of single photons serving as the basis for generating cryptographic keys. Then, the receiver 2 performs a shifting process (described later), an error correction process (described later), and a key compression process (a privacy amplification process) (described later) based on the photon bit string that is received; and generates a cryptographic key that is identical to the cryptographic key generated by the transmitter 1. That is, the transmitter 1 and the receiver 2 generate and share identical cryptographic keys. Moreover, the receiver 2 transmits downlink data to the transmitter 1 via the downlink-direction optical data communication channel of the optical fiber link 3, and receives uplink data from the transmitter 1 via the uplink-direction optical data communication channel of the optical fiber link 3.

As described above, the optical fiber link 3 functions as the following channels formed by implementing, for example, the WDM technology: a photon communication channel for the purpose of photon transmission; a downlink-direction optical data communication channel for the purpose of transmitting downlink data; and an uplink-direction optical data communication channel for the purpose of transmitting uplink data.

In the communication system 100 including the transmitter 1 and the receiver 2, in case the single photons transmitted by the transmitter 1 are tapped by a wiretapper from the optical fiber link 3, the photons undergo physical changes thereby enabling the receiver 2 that has received the photons to know that the photons have been tapped by a wiretapper. Regarding the process by which the transmitter 1 and the receiver 2 generate a cryptographic key, the details are given later. Meanwhile, in order to collectively refer to the transmitter 1 and the receiver 2, the term "communication device" is used.

FIG. 2 is a diagram illustrating a configuration example of a communication system according to a first embodiment. Thus, with reference to FIG. 2, the explanation is given about a communication system 100a according to the first embodiment.

Regarding the communication system 100a illustrated in FIG. 2, the configuration is such that three transmitters 1 (transmitters 1a to 1c) are installed in the communication system 100 illustrated in FIG. 1, and the three transmitters are connected to the receiver 2 via an optical device 4 using an optical fiber link. The transmitters 1a to 1c in the communication system 100a have identical functions to the functions of the transmitter 1 in the communication system 100. Similarly, the receiver 2 in the communication system 100a has identical functions to the functions of the receiver 2 in the communication system 100. In the case of referring to the transmitters 1a to 1c without distinguishing therebetween or in the case of collectively referring to the transmitters 1a to 1c, they are simply referred to as the "transmitters 1".

Figure 7:
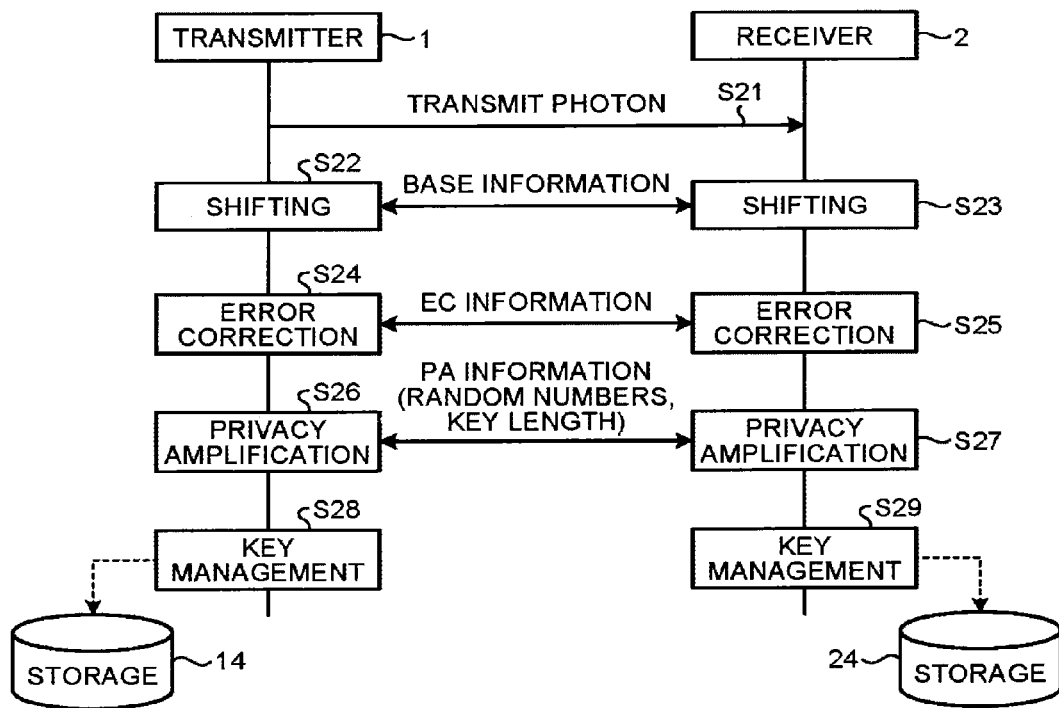
FIG. 7 is a sequence diagram illustrating an example of a quantum key distribution and a key distillation process.

The transmitter 1a and the optical device 4 are connected by an optical fiber link 3a (an optical communication path). Similarly, the transmitter 1b and the optical device 4 are connected by an optical fiber link 3b (an optical communication path). Moreover, the transmitter 1c and the optical device 4 are connected by an optical fiber link 3c (an optical communication path). The receiver 2 and the optical device 4 are connected by an optical fiber link 3d (an optical communication path). In each of the optical fiber links 3a to 3d, in an identical manner to the optical fiber link 3 illustrated in FIG. 1, the WDM technology can be implemented so as to form a photon communication channel for the purpose of communicating photons; to form a downlink-direction optical data communication channel for the purpose of transmitting downlink data; and to form an uplink-direction optical data communication channel for the purpose of transmitting uplink data. Meanwhile, in the communication system 100a, the following three types of links are configured: the link between the transmitter 1a and the receiver 2; the link between the transmitter 1b and the receiver 2; and the link between the transmitter 1c and the receiver 2. In each of these links, processes described later with reference to FIG. 7 are performed so that identical cryptographic keys are generated and shared.

Meanwhile, in the communication system 100a illustrated in FIG. 2, although three transmitters 1 are illustrated, that is not the only possible configuration. Alternatively, it is possible to have two transmitters 1 or to have four or more transmitters 1.

Moreover, in the communication system 100a illustrated in FIG. 2, the transmitter 1 and the receiver 2 are assumed to be equipped with the QAN function as well as the PON function. However, that is not the only possible case. Alternatively, each function can be implemented using a different device. However, in the following explanation, the explanation is given under the assumption that the transmitter 1 and the receiver 2 are equipped with the QAN function as well as the PON function.

Furthermore, in the communication system 100a, it is assumed that all links between the receiver 2 and each transmitter 1 include a photon communication channel, a downlink-direction optical data communication channel, and an uplink-direction optical data communication channel. However, that is not the only possible case. Alternatively, in the first embodiment, at least two or more of the links can be configured to include the three channels mentioned above.

Moreover, in the communication system 100a illustrated in FIG. 2, it is assumed that the photon communication channel, the downlink-direction optical data communication channel, and the uplink-direction optical data communication channel are formed in the same optical fiber link. However, that is not the only possible case. Alternatively, in the first embodiment, each of the three channels can be formed in a separate optical fiber link or some of the channels can be formed in the same optical fiber link. However, forming all three channels in the same optical fiber link enables achieving reduction in the cost of laying the optical fiber.

FIG. 3 is a diagram illustrating a block configuration of a transmitter and a receiver. With reference to FIG. 3, the explanation is given about a functional block configuration of the transmitter 1 and the receiver 2. In FIG. 3, only a single transmitter 1 is illustrated for simplifying the explanation.

As illustrated in FIG. 3, the transmitter 1 includes a optical fiber link connecting unit 10, a quantum key sharing unit 11 (a second quantum key sharing unit), a key distilling unit 12 (a second key distilling unit), a key managing/providing unit 13, a storage 14, an optical data communicating unit 15, a synchronization controller 16, an photon communication controller 17 (a second photon communication controller), and an optical data communication controller 18 (a second data communication controller).

The optical fiber link connecting unit 10 is a functional component that establishes a connection with a optical fiber link connecting unit 20 (described later) of the receiver 2, by the optical fiber link 3. More particularly, the optical fiber link connecting unit 10, along with the optical fiber link connecting unit 20 of the receiver 2, forms, in the optical fiber link 3, a photon communication channel 30 for the purpose of photon transmission, a downlink-direction optical data communication channel 31 for the purpose of receiving downlink data, and an uplink-direction optical data communication channel 32 for the purpose of transmitting uplink data (i.e., forms data communication channels). Meanwhile, the optical fiber link 3 can be configured with a plurality of optical fibers.

The quantum key sharing unit 11 is a functional component that performs quantum key distribution. More particularly, the quantum key sharing unit 11 transmits, to the receiver 2 via the photon communication channel 30, a photon bit string that is made of single photons having the state based on basis information generated in a random manner as against a bit string generated using random numbers. Herein, the quantum key sharing unit 11 transmits the photon bit string to the receiver 2 according a timeslot (a photon timeslot) assigned thereto from the photon communication controller 17. Then, the quantum key sharing unit 11 receives, via the downlink-direction optical data communication channel 31, basis information that is generated in a random manner by the receiver 2 (a quantum key sharing unit 21 (described later)) for the purpose of reading the received photon bit strings. Subsequently, the quantum key sharing unit 11 compares the basis information generated by itself with the basis information received from the quantum key sharing unit 21, and performs a shifting process in which the bits corresponding to the matching portion are extracted from the photon bit string and treated as a shared bit string. Meanwhile, the shifting process explained herein is only exemplary, and it is possible to implement some other method too.

The key distilling unit 12 is a functional component for performing a key distillation process. More particularly, the key distilling unit 12 performs an error correction process by exchanging control data (error correction (EC) information) with a key distilling unit 22 (described later) via the downlink-direction optical data communication channel 31 and the uplink-direction optical data communication channel 32; correcting the bit errors in the shared bit string; and generating a post-correction bit string. Herein, the post-correction bit string generated by the key distilling unit 12 matches with a post-correction bit string that is generated by the key distilling unit 22 (described later) by correcting the shared bit string. Subsequently, the key distilling unit 12 receives control data (privacy amplification (PA) information) from the key distilling unit 22 via the downlink-direction optical data communication channel 31; and performs a key compression process with respect to the post-correction bit string with the aim of cancelling out, from the number of corrected errors, the bits that are likely to have been tapped by a wiretapper during quantum key distribution and the error correction process. Herein, the bit string that is obtained when the key distilling unit 12 performs a key compression process with respect to the post-correction bit string is called a key bit string and serves as a cryptographic key to be shared with the receiver 2. Meanwhile, the key distillation process explained herein is only exemplary, and it is possible to implement some other method too.

The key managing/providing unit 13 is a functional component that manages the cryptographic key (the key bit string), which is generated by the key distilling unit 12, by storing it in the storage 14; and, as may be necessary, obtains the cryptographic key from the storage 14 and provides it to an application (not illustrated). Herein, besides storing the cryptographic key (the key bit string), the key managing/providing unit 13 can store at least either the photon bit string and the shared bit string generated by the quantum key sharing unit 11 or the post-correction bit string generated by the key distilling unit 12. The storage 14 is a storage device used in storing the cryptographic key generated by the key distilling unit 12.

The optical data communicating unit 15 is an interface device that performs optical data communication with the receiver 2 (an optical data communicating unit 25 (described later)) via the downlink-direction optical data communication channel 31 and the uplink-direction optical data communication channel 32. As described above, the data communicated during optical data communication can be control data required in quantum key distribution and the key distillation process or can be any other commonly-used data. Herein, the optical data communicating unit 15 transmits uplink data to the receiver 2 via the uplink-direction optical data communication channel 32 according a timeslot (a data timeslot) assigned thereto from the optical data communication controller 18. Meanwhile, the optical data communicating unit 15 includes a buffer (not illustrated) for buffering the uplink data that is to be transmitted to the receiver 2.

The synchronization controller 16 is a functional component that, while performing quantum key distribution with the receiver 2, achieves synchronization of processes between the transmitter 1 and the receiver 2. As far as the method of synchronization is concerned; for example, it is possible to make use of the downlink-direction optical data communication channel 31 and the uplink-direction optical data communication channel 32, or it is possible to form a dedicated channel for synchronization in the optical fiber link 3, or it is possible to use, for example, the global positioning system (GPS) without using the optical fiber link 3.

The photon communication controller 17 is a functional component that instructs the quantum key sharing unit 11 to transmit the photon bit string to the receiver 2 via the photon communication channel 30 according to the photon timeslot calculated by the receiver 2 (a calculator 29).

The optical data communication controller 18 is a functional component that controls the optical data communication performed by the optical data communicating unit 15. The optical data communication controller 18 instructs the optical data communicating unit 15 to transmit uplink data to the receiver 2 via the uplink-direction optical data communication channel 32 according to the data timeslot calculated by the receiver 2 (the calculator 29).

Meanwhile, the optical fiber link connecting unit 10, the quantum key sharing unit 11, the key distilling unit 12, the key managing/providing unit 13, the synchronization controller 16, the photon communication controller 17, and the optical data communication controller 18 can be implemented either using computer programs that are executed in a central processing unit (CPU) 80 (described later) or using hardware circuitry. Moreover, some functions of the quantum key sharing unit 11 can be implemented using an optical circuit device that enables transmission and reception of photons.

As illustrated in FIG. 3, the receiver 2 includes the optical fiber link connecting unit 20, the quantum key sharing unit 21 (a first quantum key sharing unit), the key distilling unit 22 (a first key distilling unit), a key managing/providing unit 23, a storage 24, the optical data communicating unit 25, a synchronization controller 26, a photon communication controller 27 (a first photon communication controller), an optical data communication controller 28 (a first data communication controller), and the calculator 29 (a calculator).

The optical fiber link connecting unit 20 is a functional component that establishes a connection with a optical fiber link connecting unit 10 of the transmitter 1, by the optical fiber link 3. More particularly, the optical fiber link connecting unit 20, along with the optical fiber link connecting unit 10 of the transmitter 1, forms, in the optical fiber link 3, the photon communication channel 30 for the purpose of photon transmission, the downlink-direction optical data communication channel 31 for the purpose of receiving downlink data, and the uplink-direction optical data communication channel 32 for the purpose of transmitting uplink data. Meanwhile, the optical fiber link 3 can be configured with a plurality of optical fibers.

The quantum key sharing unit 21 is a functional component that performs quantum key distribution. More particularly, the quantum key sharing unit 21 receives, from the transmitter 1 via the photon communication channel 30, a photon bit string and reads the photon bit string based on basis information generated in a random manner. Then, the quantum key sharing unit 21 receives, via the uplink-direction optical data communication channel 32, the basis information generated in a random manner by the transmitter 1 the quantum key sharing unit 11) for the purpose of transmitting photon bit strings. Subsequently, the quantum key sharing unit 21 compares the basis information generated by itself with the basis information received from the quantum key sharing unit 11, and performs a shifting process in which the bits corresponding to the matching portion are extracted from the photon bit string and treated as a shared bit string. Meanwhile, the shifting process explained herein is only exemplary, and it is possible to implement some other method too.

The key distilling unit 22 is a functional component for performing a key distillation process. More particularly, the key distilling unit 22 performs an error correction process by exchanging control data (EC information) with the key distilling unit 12 via the downlink-direction optical data communication channel 31 and the uplink-direction optical data communication channel 32; correcting the bit errors in the shared bit string; and generating a post-correction bit string. Herein, the post-correction bit string generated by the key distilling unit 22 matches with the post-correction bit string that is generated by the key distilling unit 12 by correcting the shared bit string. Subsequently, the key distilling unit 22 generates control data (PA information) and transmits it to the key distilling unit 12 via the downlink-direction optical data communication channel 31; and, based on the PA information, performs a key compression process with respect to the post-correction bit string with the aim of cancelling out, from the number of corrected errors, the bits that are likely to have been tapped by a wiretapper during quantum key distribution and the error correction process. Herein, the bit string that is obtained when the key distilling unit 22 performs a key compression process with respect to the post-correction bit string is called a key bit string and serves as a cryptographic key to be shared with the transmitter 1. Meanwhile, the key distillation process explained herein is only exemplary, and it is possible to implement some other method too.

The key managing/providing unit 23 is a functional component that manages the cryptographic key (the key bit string), which is generated by the key distilling unit 22, by storing it in the storage 24; and, as may be necessary, obtains the cryptographic key from the storage 24 and provides it to an application (not illustrated). Herein, besides storing the cryptographic key (the key bit string), the key managing/providing unit 23 can store at least either the photon bit string and the shared bit string generated by the quantum key sharing unit 21 or the post-correction bit string generated by the key distilling unit 22. The storage 24 is a storage device used in storing the cryptographic key generated by the key distilling unit 22.

The optical data communicating unit 25 is an interface that performs optical data communication with the transmitter 1 (the optical data communicating unit 15) via the downlink-direction optical data communication channel 31 and the uplink-direction optical data communication channel 32. As described above, the data communicated during optical data communication can be control data required in quantum key distribution and the key distillation process or can be any other commonly-used data. Meanwhile, the optical data communicating unit 25 includes a buffer (not illustrated) for buffering the downlink data that is to be transmitted to the transmitter 1.

The synchronization controller 26 is a functional component that, while performing quantum key distribution with the transmitter 1, achieves synchronization of processes between the receiver 2 and the transmitter 1. As far as the method of synchronization is concerned; for example, it is possible to make use of the downlink-direction optical data communication channel 31 and the uplink-direction optical data communication channel 32, or it is possible to form a dedicated channel for synchronization in the optical fiber link 3, or it is possible to use, for example, the global positioning system (GPS) without using the optical fiber link 3.

The photon communication controller 27 is a functional component that instructs the quantum key sharing unit 21 to receive the photon bit string, which is transmitted from the quantum key sharing unit 11 according to the photon timeslot calculated by the calculator 29, via the photon communication channel 30.

The optical data communication controller 28 is a functional component that controls the optical data communication performed by the optical data communicating unit 25. The optical data communication controller 28 instructs the optical data communicating unit 25 to receive the uplink data, which is transmitted from the optical data communication unit 15 according to the data timeslot calculated by the calculator 29, via the uplink-direction optical data communication channel 32.

The calculator 29 is a functional component that calculates photon timeslots within which a plurality of transmitters 1 transmits photon bit strings to the receiver 2 in a time-shared manner via the photon communication channel 30. Moreover, the calculator 29 calculates data timeslots within which a plurality of transmitters 1 transmits uplink data to the receiver 2 in a time-shared manner via the uplink-direction optical data communication channel 32. The processes by which the calculator 29 calculates the photon timeslots and the data timeslots is described later.

Meanwhile, the optical fiber link connecting unit 20, the quantum key sharing unit 21, the key distilling unit 22, the key managing/providing unit 23, the synchronization controller 26, the photon communication controller 27, and the optical data communication controller 28 can be implemented either using computer programs that are executed in the CPU 80 (described later) or using hardware circuitry. Moreover, some functions of the quantum key sharing unit 21 can be implemented using an optical circuit device that enables transmission and reception of photons.

The block configuration of the transmitter 1 and the receiver 2 as illustrated in FIG. 3 is only an exemplary conceptual illustration of the functions. Thus, the configuration is not limited to such block configuration.

Figure 4:
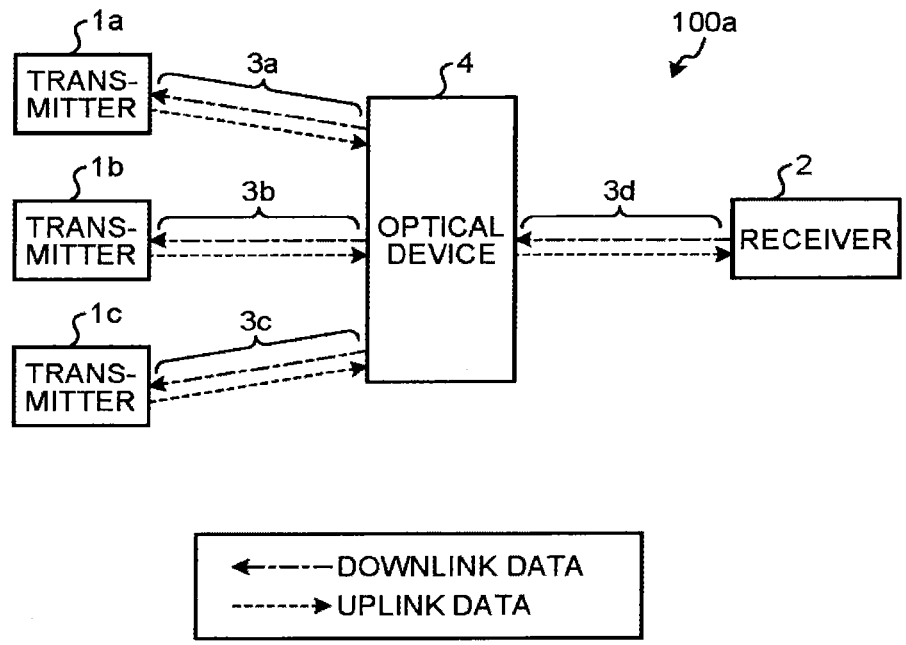
FIG. 4 is a diagram for explaining the flow of data during optical data communication performed in the communication system.
Figure 5:
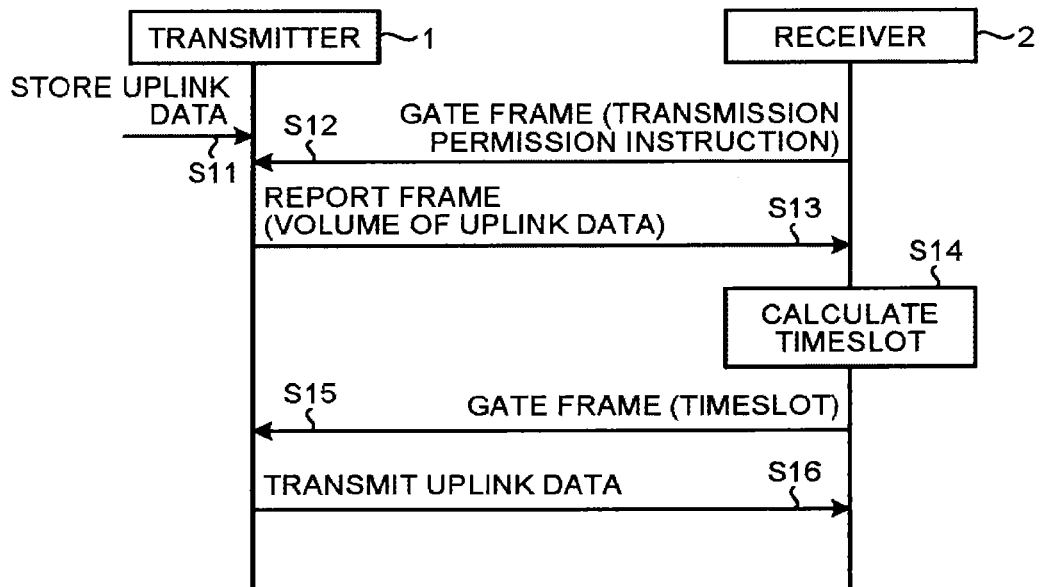
FIG. 5 is a sequence diagram illustrating assignment of timeslots using dynamic bandwidth allocation (DBA) of a passive optical network (PON)

FIG. 4 is a diagram for explaining the flow of data during optical data communication performed in the communication system. FIG. 5 is a sequence diagram illustrating assignment of timeslots using DBA of a PON. With reference to FIGS. 4 and 5, the explanation is given about the processes for calculating and assigning dynamic data timeslots using DBA in the case in which the communication system 100a functions as a PON. Herein, of the communication system 100a illustrated in FIG. 2, the portion constituting a PON is selectively illustrated in FIG. 4. Moreover, in FIG. 5 is illustrated the sequence of processes performed between a single transmitter 1 and the receiver 2. However, in practice, as in the case of the communication system 100a illustrated in FIG. 2, the same sequence of processes is followed between each of a plurality of transmitters 1 and the receiver 2.

Step S11

The optical data communicating unit 15 of the transmitter 1 obtains uplink data to be transmitted to the receiver 2, and stores the uplink data in the corresponding buffer.

Step S12

The optical data communication controller 28 of the receiver 2 sequentially transmits GATE frames, as transmission permission instructions, to each transmitter 1. For example, the optical data communication controller 28 periodically transmits GATE frames, as transmission permission instructions, to each transmitter 1. Herein, the GATE frames can be transmitted to the transmitters 1 using the downlink-direction optical data communication channel 31, or using a separate channel in the optical fiber link 3 (3a to 3d), or a communication line other than the optical fiber link 3 (3a to 3d).

Step S13

The optical data communication controller 18 of each transmitter 1 receives a GATE frame as a transmission permission instruction from the receiver 2, and transmits to the receiver 2 a REPORT frame that includes information indicating the volume of the uplink data that is currently stored in the buffer of the optical data communicating unit 15. Herein, the REPORT frame can be transmitted to the receiver 2 using the uplink-direction optical data communication channel 32, or using a separate channel in the optical fiber link 3 (3a to 3d), or a communication line other than the optical fiber link 3 (3a to 3d).

Step S14

The optical data communication controller 28 receives, from each transmitter 1, the REPORT frame that includes information (second information) indicating the volume of the stored uplink data. Then, based on the volume of the stored uplink data specified in the REPORT frame and based on the information about the data timeslots that are currently assigned to the transmitters 1, the calculator 29 of the receiver 2 calculates the data timeslot to be assigned to the transmitter 1 that transmitted the REPORT frame.

Step S15

The optical data communication controller 28 transmits, to the transmitter 1 that transmitted the REPORT frame, a GATE frame that includes information about the data timeslot calculated by the calculator 29. Herein, the GATE frame can be transmitted to the transmitter 1 using the downlink-direction optical data communication channel 31, or using a separate channel in the optical fiber link 3 (3a to 3d), or a communication line other than the optical fiber link 3 (3a to 3d).

Step S16

In the transmitter 1 that receives the GATE frame including information about the data timeslot, the optical data communication controller 18 instructs the optical data communicating unit 15 to transmit uplink data to the receiver 2 (the optical data communication controller 28) via the uplink-direction optical data communication channel 32 according to the transmission start timing and the transmittable time period indicated by the data timeslot.

As a result of repeating the processes of calculating and assigning a data timeslot using DBA of the communication system 100a functioning as a PON, it becomes possible to assign data timeslots in a dynamic manner and to achieve efficient transmission of uplink data via the uplink-direction optical data communication channel 32.

As described above, the data timeslots can be configured with the transmission start timing and the transmittable time period. Alternatively, the data timeslots can represent information, such as information containing the transmittable time period and the non-transmittable time period, that is sufficient in repeatedly enabling to start and end the subsequent transmissions of uplink data.

Figure 6:
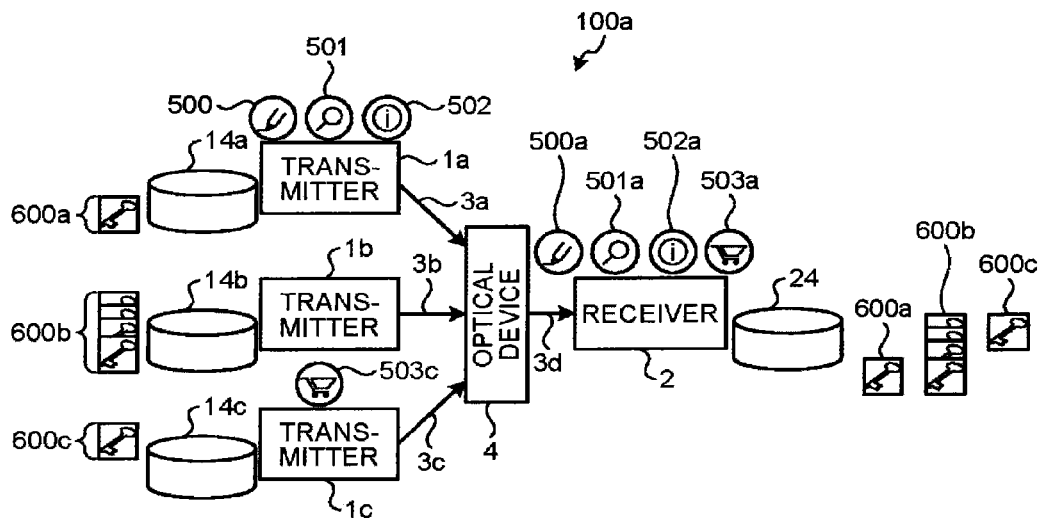
FIG. 6 is a diagram illustrating the sequence of photon transmission in a communication system.
Figure 8:
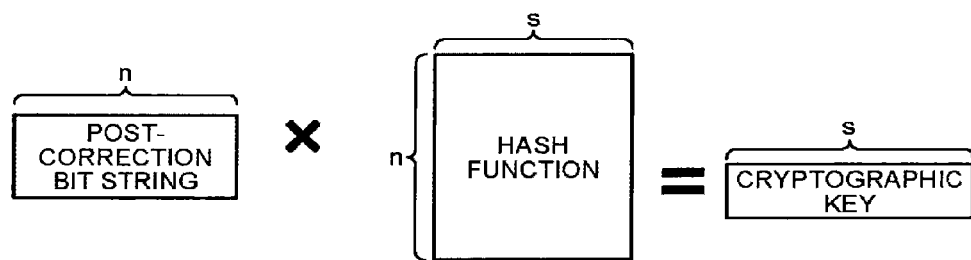
FIG. 8 is a diagram for explaining a key compression process.

FIG. 6 is a diagram illustrating the sequence of photon transmission in a communication system. FIG. 7 is a sequence diagram illustrating an example of the processes performed during quantum key distribution and the key distillation process. FIG. 8 is a diagram for explaining the key compression process. Thus, with reference to FIGS. 6 to 8, the explanation is given about quantum key distribution and the key distillation process performed in the communication system 100a functioning as a QAN. Herein, of the communication system 100a illustrated in FIG. 2, the portion constituting a QAN is selectively illustrated in FIG. 6. Moreover, in FIG. 7 is illustrated the sequence of processes performed between a single transmitter 1 and the receiver 2. However, in practice, as in the case of the communication system 100a illustrated in FIG. 2, the same sequence of processes is followed between each of a plurality of transmitters 1 and the receiver 2.

Step S21

The quantum key sharing unit 11 transmits, to the quantum key sharing unit 21 of the receiver 2 via the photon communication channel 30, a photon bit string made of, for example, single photons having the state based on basis information generated in a random manner as against a bit string generated using random numbers. Herein, the quantum key sharing unit 11 transmits the photon bit string to the receiver 2 according to the photon timeslot assigned thereto from the photon communication controller 17. The processes of calculating and assigning the photon timeslot are described later. Then, the quantum key sharing unit 21 receives the photon bit string from the quantum key sharing unit 11 via the photon communication channel 30, and reads the photon bit string based on basis information generated in a random manner.

Step S22

The quantum key sharing unit 11 receives, via the downlink-direction optical data communication channel 31, basis information that is generated in a random manner by the quantum key sharing unit 21 for the purpose of reading the received photon bit strings. Then, the quantum key sharing unit 11 compares the basis information generated by itself with the basis information received from the quantum key sharing unit 21, and performs a shifting process in which the bits corresponding to the matching portion are extracted from the photon bit string and treated as a shared bit string. Subsequently, the quantum key sharing unit 11 transmits the shared bit string to the key distilling unit 12. Meanwhile, the shifting process explained herein is only exemplary.

Step S23

The quantum key sharing unit 21 receives, via the uplink-direction optical data communication channel 32, the basis information generated in a random manner by the quantum key sharing unit 11 for the purpose of transmitting the photon bit string. Then, the quantum key sharing unit 21 compares the basis information generated by itself with the basis information received from the quantum key sharing unit 11, and performs a shifting process in which the bits corresponding to the matching portion are extracted from the photon bit string and treated as a shared bit string. Subsequently, the quantum key sharing unit 21 transmits the shared bit string to the key distilling unit 22. Meanwhile, the shifting process explained herein is only exemplary.

Step S24

The key distilling unit 12 performs an error correction process that includes correcting the bit errors in the shared bit string based on the EC information exchanged with the key distilling unit 22 via the downlink-direction optical data communication channel 31 and the uplink-direction optical data communication channel 32, and generating a post-correction bit string. Herein, the post-correction bit string generated by the key distilling unit 12 matches with the post-correction bit string that is generated by the key distilling unit 22 (described below) by correcting the shared bit string.

Step S25

The key distilling unit 22 performs an error correction process that includes correcting the bit errors in the shared bit string based on the EC information exchanged with the key distilling unit 12 via the downlink-direction optical data communication channel 31 and the uplink-direction optical data communication channel 32, and generating a post-correction hit string. Herein, the post-correction bit string generated by the key distilling unit 22 matches with the post-correction bit string that is generated by the key distilling unit 12 by correcting the shared bit string.

Step S26

Based on the PA information (random numbers and the length of cryptographic keys) received from the key distilling unit 22 via the downlink-direction optical data communication channel 31, the key distilling unit 12 performs a key compression process with respect to the post-correction bit string with the aim of cancelling out, from the number of corrected errors, the bits that are likely to have been tapped by a wiretapper during quantum key distribution and the error correction process; and generates a cryptographic key (a key bit string). More particularly, the key distilling unit 12 generates, as illustrated in FIG. 8, a hash function in the form of an n×s matrix from a length n of the post-correction bit string, the random numbers included in the PA information, and a length s of cryptographic keys. Then, the key distilling unit 12 multiplies the hash function to the post-correction bit string, and generates a cryptographic key (a key bit string) having the length s. Subsequently, the key distilling unit 12 transmits the generated cryptographic key to the key managing/providing unit 13. Meanwhile, the method implemented for the key compression process is not limited to using the hash function as described above. That is, the key compression process can be performed using some other method too.

Step S27

The key distilling unit 22 generates PA information and transmits it to the key distilling unit 12 via the downlink-direction optical data communication channel 31; and, based on that PA information, performs a key compression process with respect to the post-correction bit string with the aim of cancelling out, from the number of corrected errors, the bits that are likely to have been tapped by a wiretapper during quantum key distribution and the error correction process, and generates a cryptographic key (a key bit string). More particularly, the key distilling unit 22 performs the key compression process in an identical manner to the key distilling unit 12, and generates a cryptographic key (a key bit string). Then, the key distilling unit 22 transmits the generated cryptographic key to the key managing/providing unit 23.

Step S28

The key managing/providing unit 13 manages the cryptographic key (the key bit string), which is generated by the key distilling unit 12, by storing it in the storage 14. Then, as may be necessary, the key managing/providing unit 13 obtains the cryptographic key from the storage 14 and provides it to an external application.

Step S29

The key managing/providing unit 23 manages the cryptographic key (the key bit string), which is generated by the key distilling unit 22, by storing it in the storage 24. Then, as may be necessary, the key managing/providing unit 23 obtains the cryptographic key from the storage 24 and provides it to an external application.

As a result of performing the processes described above, identical cryptographic keys are generated in the transmitter 1 and the receiver 2. As a result of repeating the processes described above, different cryptographic keys are generated in sequence.

Herein, the basis information, the EC information, and the PA information are transmitted and received between the transmitter 1 and the receiver 2 via the downlink-direction optical data communication channel 31 and the uplink-direction optical data communication channel 32. However, that is not the only possible case. Alternatively, for example, the abovementioned information can also be transmitted using a separate channel in the optical fiber link 3 (3a to 3d) or using a communication line other than the optical fiber link 3 (3a to 3d).

Figure 9:
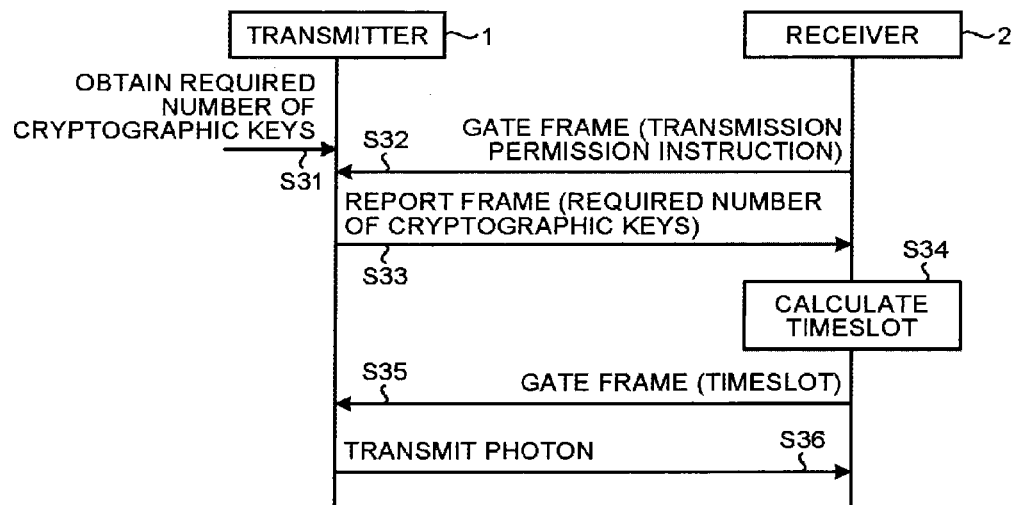
FIG. 9 is a sequence diagram illustrating the assignment of timeslots using DBA of a quantum access network (QAN)

FIG. 9 is a sequence diagram illustrating the assignment of timeslots using DBA of a QAN. With reference to FIGS. 6 and 9, the explanation is given about calculating and assigning the photon timeslots in a dynamic manner using DBA in the case in which the communication system 100a functions as a QAN.

Firstly, with reference to FIG. 6, an example is given about the number of cryptographic keys shared by the transmitters 1a to 1c with the receiver 2 and the number of applications being executed.

Herein, it is assumed that the transmitters 1a to 1c respectively include storages 14a to 14c. The receiver 2 includes the storage 24.

As illustrated in FIG. 6, in the communication system 100a, there are three types of links, namely, a link between the transmitter 1a and the receiver 2 (hereinafter, called a link A), a link between the transmitter 1b and the receiver 2 (hereinafter, called a link B), and a link between the transmitter 1c and the receiver 2 (hereinafter, called a link C). With respect to each of these links, identical cryptographic keys are generated and shared between the corresponding transmitter 1 and the receiver 2 (i.e., different cryptographic links are generated among the links) according to the quantum key distribution and the key distillation process illustrated in FIG. 7.

The transmitter 1a is connected to an external device that is capable of communicating with the transmitter 1a and that executes three types of applications, namely, applications 500 to 502. Meanwhile, the number of external devices is not limited to one. For example, there can be three external devices each of which executes one of the applications 500 to 502, or there can be two external devices one of which executes the applications 500 and 501 and the other external device executes the application 502. Alternatively, at least one of the applications 500 to 502 may be executed by the transmitter 1a instead of an external device.

The transmitter 1c is connected to an external device that is capable of communicating with the transmitter 1c and that executes the application 503c. However, the application 503c may be executed in the transmitter 1c instead of an external device.

The receiver 2 is connected to an external device that is capable of communicating with the receiver 2 and that executes four types of applications, namely, applications 500a to 503a. Meanwhile, the number of external devices is not limited to one. For example, there can be two external devices one of which executes the applications 500a and 501a, while the other external device executes the applications 502a and 503a. Alternatively, at least one of the applications 500a to 503a may be executed by the receiver 2 instead of an external device.

The application 500, the application 501, the application 502, and the application 503c respectively correspond to the applications 500a to 503a; and data communication is performed between the applications. The transmitter 1a and the receiver 2 generate cryptographic keys for the link A that enable the applications 500 to 502 to perform cryptographic communication with the applications 500a to 502a, respectively. Then, a cryptographic key 600a representing a bundle of the generated cryptographic keys is stored in the storages 14a and 24. The transmitter 1c and the receiver 2 generate cryptographic keys for the link C that enable the application 503c to perform cryptographic communication with the application 503a. Then, a cryptographic key 600c representing a bundle of the generated cryptographic keys is stored in the storages 14c and 24. Herein, it is assumed that no application is being executed in the external devices connected to the transmitter 1b and the receiver 2 or no application is being executed in the transmitter 1b and the receiver 2. However, the transmitter 1b and the receiver 2 generate cryptographic keys for the link B; and a cryptographic key 600b, which represents a bundle of the generated cryptographic keys, is stored in the storages 14b and 24.

As described above, in the communication system 100a functioning as a QAN, the timing of use and the amount of use of a shared cryptographic key differs according to the type of applications and the number of applications executed in each transmitter and the receiver. In the communication system 100a, if fixed timeslots are assigned to a plurality of transmitters 1 and if photon transmission is performed according to those timeslots, then efficiency is not achieved in sharing the cryptographic keys and using the cryptographic keys. In that regard, for example, with respect to a transmitter in which only a small number of currently-stored cryptographic keys are available or with respect to a transmitter in which a number of cryptographic communication applications using cryptographic keys are run, assigning a longer photon timeslot in a dynamic manner is an efficient way to enable sharing of more cryptographic keys.

For example, in the communication system 100a illustrated in FIG. 6, in the link A, a large number of applications are executed as against the number of cryptographic keys 600a that are stored. In the link B, although a certain number of cryptographic keys 600b are stored, no applications are executed. In the link C, the number of cryptographic keys 600c that are stored is in proportion to the number of executed applications. In these states of the three links, a large number of cryptographic keys need to be generated and shared in the link A. In that regard, in the communication system 100a, if longer photon timeslots are assigned to the transmitters 1b and 1c and if a shorter photon timeslot is assigned to the transmitter 1a; efficiency cannot be achieved in sharing the cryptographic keys and using the cryptographic keys. In such a case, assigning a longer photon timeslot to the transmitter 1a in a dynamic manner and assigning shorter photon timeslots to the transmitters 1b and 1c in a dynamic manner enables achieving efficiency in sharing the cryptographic keys and using the cryptographic keys. Explained below with reference to FIGS. 6 and 9 are the processes of calculating and assigning the photon timeslots in a dynamic manner using DBA based on the number of cryptographic keys required by each transmitter.

Step S31

In each transmitter 1, the key managing/providing unit 13 obtains the number of cryptographic keys that are currently required by the corresponding transmitter 1. Examples of the method of obtaining the required number of cryptographic keys include a method based on the amount of stored data that requires encryption, or a method based on the number of cryptographic keys required by the applications that run using cryptographic keys, or the number of remaining cryptographic keys that are currently stored in the storage 14, or the number of the running applications.

Step S32

The optical data communication controller 28 of the receiver 2 sequentially transmits GATE frames, as transmission permission instructions, to each transmitter 1. For example, the optical data communication controller 28 periodically transmits GATE frames, as transmission permission instructions, to each transmitter 1. Herein, the GATE frames can be transmitted to the transmitters 1 using the downlink-direction optical data communication channel 31, or using a separate channel in the optical fiber link 3 (3a to 3d), or a communication line other than the optical fiber link 3 (3a to 3d).

Step S33

The optical data communication controller 18 of each transmitter 1 receives a GATE frame as a transmission permission instruction from the receiver 2, and transmits to the receiver 2 a REPORT frame that includes information (first information) indicating the required number of cryptographic keys that is obtained by the key managing/providing unit 13. Moreover, the REPORT frame can also include statistical information such as the number of cryptographic keys that are currently stored in the storage 14 or the number of applications that require cryptographic keys. Herein, the REPORT frame can be transmitted to the receiver 2 using the uplink-direction optical data communication channel 32, or using a separate channel in the optical fiber link 3 (3a to 3d), or a communication line other than the optical fiber link 3 (3a to 3d).

Step S34

The optical data communication controller 28 receives, from each transmitter 1, the REPORT frame that includes the information indicating the required number of cryptographic keys. Then, based on the required number of cryptographic keys that is specified in the REPORT frame and the number of cryptographic keys that are currently shared with the transmitter 1 that transmitted the REPORT frame, the calculator 29 of the receiver 2 calculates the photon timeslot to be assigned to the transmitter 1 that transmitted the REPORT frame.

Step S35

The optical data communication controller 28 transmits, to the transmitter 1 that transmitted the REPORT frame, a GATE frame that includes information about the photon timeslot calculated by the calculator 29. Herein, the GATE frame can be transmitted to the transmitter 1 using the downlink-direction optical data communication channel 31, or using a separate channel in the optical fiber link 3 (3a to 3d), or a communication line other than the optical fiber link 3 (3a to 3d).

Step S36

In the transmitter 1 that receives the GATE frame including information about the photon timeslot, the photon communication controller 17 instructs the quantum key sharing unit 11 to transmit the photon bit string to the receiver 2 (the quantum key sharing unit 21) via the photon communication channel 30 according to the transmission start timing and the transmittable time period indicated by the photon timeslot.

As described above, the photon timeslots can be configured with the transmission start timing and the transmittable time period. Alternatively, the photon timeslots can represent information, such as information containing the transmittable time period and the non-transmittable time period, that is sufficient in repeatedly enabling to start and end the subsequent transmissions of photon bit strings.

As described above, as a result of repeating the processes of calculating and assigning a photon timeslot using DBA of the communication system 100a functioning as a QAN, photon timeslots can be assigned in a dynamic manner in the photon communication channel 30 thereby enabling achieving efficiency in sharing of the cryptographic keys and using the cryptographic keys in the QAN. More particularly, it becomes possible to share more cryptographic keys between the transmitters 1 in need of cryptographic keys and the receiver 2.

Second Embodiment

The processes performed in a communication system according to a second embodiment are explained with a focus on the differences in the configuration and processes with the communication system 100a according to the first embodiment. Herein, the configuration of the communication system according to the second embodiment as well as the block configuration of the transmitters 1 and the receiver 2 is identical to the first embodiment. Moreover, the quantum key distribution and the key distillation process performed in the communication system according to the second embodiment are identical to the first embodiment.

In the first embodiment, the following two sets of processes are performed: the process of calculating and assigning data timeslots using DBA in the case in which the communication system 100a functions as a PON; and the process of calculating and assigning photon timeslots using DBA in the case in which the communication system 100a functions as a QAN. Thus, from the perspective of performing two sets of processes, there are times when the system resources may be used in an inefficient manner.

Moreover, in the communication system 100a illustrated in FIG. 2, the data timeslots in the uplink-direction optical data communication channel and the photon timeslots in the optical communication path are likely to have a positive correlation due to the following reasons. For example, the transmitter 1 that transmits a large volume of uplink data needs many cryptographic keys. Accordingly, the transmitter 1 that has a long data timeslot assigned thereto in the uplink-direction optical data communication channel should also be assigned with a long photon timeslot in the optical communication path. Moreover, in the quantum key distribution and the key distillation process described above, the uplink-direction optical data communication channel is used in transmitting control data. In that case, the transmitter 1 to which a long photon timeslot is assigned in the optical communication path requires communication of a large volume of control data. Hence, that transmitter 1 needs to be assigned with a long data timeslot in the uplink-direction optical data communication channel.

In that regard, in the communication system according to the second embodiment, the explanation is given about an process for matching the photon timeslots in the optical communication path and the data timeslots in the uplink-direction optical data communication channel.

Figure 10:
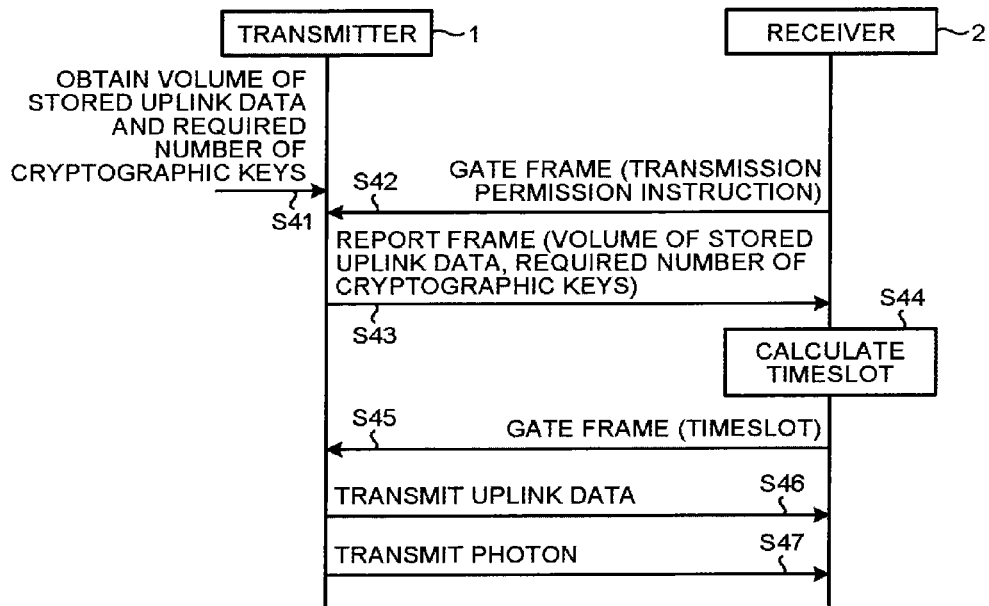
FIG. 10 is a sequence diagram illustrating the assignment of timeslots in a PON according to the second embodiment.
Figure 11:
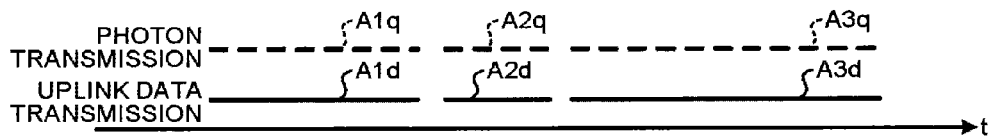
FIG. 11 is a diagram illustrating an example of the traffic flow according to the second embodiment.

FIG. 10 is a sequence diagram illustrating the assignment of timeslots in a PON according to the second embodiment. FIG. 11 is a diagram illustrating an example of the traffic flow according to the second embodiment. Thus, with reference to FIGS. 10 and 11, the explanation is given about the processes for calculating and assigning dynamic data timeslots using DBA in the case in which the communication system according to the second embodiment functions as a PON. Herein, in FIG. 10 is illustrated the sequence of processes performed between a single transmitter 1 and the receiver 2. However, in practice, as in the case of the communication system 100a illustrated in FIG. 2, the same sequence of processes is followed between each of a plurality of transmitters 1 and the receiver 2.

Step S41

In each transmitter 1, the key managing/providing unit 13 obtains the number of cryptographic keys that are currently required by the corresponding transmitter 1. Examples of the method of obtaining the required number of cryptographic keys include a method based on the amount of stored data that requires encryption, or a method based on the number of cryptographic keys required by the applications that run using cryptographic keys, or the number of remaining cryptographic keys that are currently stored in the storage 14, or the number of the running applications.

Step S42

The optical data communication controller 28 of the receiver 2 sequentially transmits GATE frames, as transmission permission instructions, to each transmitter 1. For example, the optical data communication controller 28 periodically transmits GATE frames, as transmission permission instructions, to each transmitter 1. Herein, the GATE frames can be transmitted to the transmitters 1 using the downlink-direction optical data communication channel 31, or using a separate channel in the optical fiber link 3 (3a to 3d), or a communication line other than the optical fiber link 3 (3a to 3d).

Step S43

The optical data communication controller 18 of each transmitter 1 receives a GATE frame as a transmission permission instruction from the receiver 2, and transmits to the receiver 2 a REPORT frame that includes information indicating the volume of uplink data currently stored in the buffer of the optical data communicating unit 15 and information indicating the required number of cryptographic keys that is obtained by the key managing/providing unit 13. Moreover, the REPORT frame can also include statistical information such as the number of cryptographic keys that are currently stored in the storage 14 or the number of applications that require cryptographic keys. Furthermore, the REPORT frame can also include information about the amount of stored data that requires encryption, or information about the number of cryptographic keys required by the applications that run using cryptographic keys, or information about the number of remaining cryptographic keys that are currently stored in the storage 14. Herein, the REPORT frame can be transmitted to the receiver 2 using the uplink-direction optical data communication channel 32, or using a separate channel in the optical fiber link 3 (3a to 3d), or a communication line other than the optical fiber link 3 (3a to 3d).

Step S44

The optical data communication controller 28 receives, from each transmitter 1, the REPORT frame that includes information indicating the volume of the stored uplink data and information indicating the required number of cryptographic keys. Then, based on the volume of the stored uplink data as specified in the REPORT frame, based on the required number of cryptographic keys, and based on the information about the data timeslot that is currently assigned to each transmitter 1; the calculator 29 of the receiver 2 calculates the data timeslot to be assigned to the transmitter 1 that transmitted the REPORT frame. If the REPORT frame also includes information about the amount of stored data that requires encryption, or information about the number of cryptographic keys required by the applications that run using cryptographic keys, or information about the number of remaining cryptographic keys that are currently stored in the storage 14; that information can also be used in calculating the data timeslot. Moreover, the calculator 29 can obtain a photon timeslot that is identical to the calculated data timeslot.

Step S45

The optical data communication controller 28 transmits, to the transmitter 1 that transmitted the REPORT frame, a GATE frame that includes information about the data timeslot calculated by the calculator 29 and includes the photon timeslot. Herein, the GATE frame can be transmitted to the transmitter 1 using the downlink-direction optical data communication channel 31, or using a separate channel in the optical fiber link 3 (3a to 3d), or a communication line other than the optical fiber link 3 (3a to 3d).

Step S46

In the transmitter 1 that receives the GATE frame including information about the data timeslot, the optical data communication controller 18 instructs the optical data communicating unit 15 to transmit uplink data to the receiver 2 (the optical data communication controller 28) via the uplink-direction optical data communication channel 32 according to the transmission start timing and the transmittable time period indicated by the data timeslot.

Step S47

In the transmitter 1 that receives the GATE frame including information about the data timeslot, the photon communication controller 17 instructs the quantum key sharing unit 11 to transmit the photon bit string to the receiver 2 (the quantum key sharing unit 21) via the photon communication channel 30 according to the transmission start timing and the transmittable time period indicated by the photon timeslot included in the GATE frame. As a result, as illustrated in FIG. 11, the data timeslot and the photon timeslot assigned to each transmitter 1 match in timing (the timing start timing) and the length (a transmission start period). That is, with reference to FIG. 2, a data timeslot A1$d$ and a photon timeslot A1$q$ assigned to the transmitter 1$a$ match with each other. Similarly, a data timeslot A2$d$ and a photon timeslot A2$q$ assigned to the transmitter 1$b$ match with each other. Moreover, a data timeslot A3$d$ and a photon timeslot A3$q$ assigned to the transmitter 1$c$ match with each other.

As described above, the receiver 2 calculates the data timeslot based on PON-related information (hereinafter, called PON information) such as the volume of uplink data from the transmitter 1 and the information about the current data timeslot; and QAN-related information (hereinafter, called QAN information) such as the required number of cryptographic keys, the amount of stored data that requires encryption, the number of cryptographic keys required by the applications that run using cryptographic keys, the number of remaining cryptographic keys that are currently stored in the storage 14, the number of currently-shared cryptographic keys, and information about the current photon timeslot. Then, the receiver 2 obtains a photon timeslot identical to the calculated data timeslot. According to the calculated data timeslot calculated by the receiver 2, the transmitter 1 transmits uplink data. Moreover, according to the photon timeslot, the transmitter 1 transmits the photon bit string. In this way, in the communication system according to the second embodiment, the data timeslot as well as the photon timeslot is obtained by performing the process of calculating the timeslot (in the abovementioned case, the data timeslot) using DBA only once. That enables achieving reduction in the processing load, thereby making it possible to use the system resources in an efficient manner. As a result, the timeslot control becomes simplified in the transmitter 1 as well as the receiver 2.

Moreover, the data timeslot in the uplink-direction optical data communication channel and the photon timeslot in the optical communication path are matched with each other under the assumption that the timeslots have a positive correlation due to the reasons mentioned above. As a result, it becomes possible to achieve efficient transmission of the uplink data via the uplink-direction optical data communication channel as well as to achieve efficiency in sharing the cryptographic keys and using the cryptographic keys in a QAN.

Furthermore, as described above, each data timeslot and the photon timeslot matching to that data timeslot is obtained based on the PON information and the QAN information. As a result, it becomes possible to achieve more efficient processes of the uplink data as well as to achieve more efficiency in sharing the cryptographic keys and using the cryptographic keys.

Meanwhile, in the example of processes illustrated in FIG. 10, it is assumed that the receiver 2 calculates the data timeslots based on the PON information and the QAN information. However, that is not the only possible case. Alternatively, for example, the receiver 2 can calculate the photon timeslots based on the PON information and the QAN information, and then obtain the matching data timeslots. Still alternatively, the receiver 2 can calculate the data timeslots based on the PON information and then obtain the matching photon timeslots. Still alternatively, the receiver 2 can calculate the photon timeslots based on the QAN information and then obtain the matching data timeslots. However, as described above, when the data timeslots or the photon timeslots are calculated based on the PON information as well as the QAN information, it becomes possible to achieve more efficiency in uplink data transmission and to achieve more efficiency in sharing the cryptographic keys and using the cryptographic keys.

Meanwhile, in the communication system 100$a$ that has an identical configuration to the communication system according to the second embodiment, it is assumed that all links between the receiver 2 and each transmitter 1 include a photon communication channel, a downlink-direction optical data communication channel, and an uplink-direction optical data communication channel. However, that is not the only possible case. Alternatively, in the second embodiment, at least two or more of the links can be configured to include the three channels mentioned above.

Moreover, in the communication system 100$a$ that has an identical configuration to the communication system according to the second embodiment, it is assumed that the photon communication channel, the downlink-direction optical data communication channel, and the uplink-direction optical data communication channel are formed in the same optical fiber link. However, that is not the only possible case. Alternatively, in the second embodiment, each of the three channels can be formed in a separate optical fiber link or some of the channels can be formed in the same optical fiber link. However, forming all three channels in the same optical fiber link enables achieving reduction in the cost of laying the optical fiber.

Third Embodiment

The processes performed in a communication system according to a third embodiment are explained with a focus on the differences in the configuration and processes with the communication system 100$a$ according to the first embodiment. Herein, the configuration of the communication system according to the third embodiment as well as the block configuration of the transmitters 1 and the receiver 2 is identical to the first embodiment. Moreover, the quantum key distribution and the key distillation process performed in the communication system according to the third embodiment are identical to the first embodiment.

In the first embodiment, the receiver 2 calculates the data timeslots in the uplink-direction optical data communication channel 32 based on the PON information; and calculates the photon timeslots in the photon communication channel 30 based on the QAN information. In the communication system according to the third embodiment, the receiver 2 calculates the data timeslots and the photon timeslots based on the PON information as well as the QAN information.

Thus, in the communication system according to the third embodiment, the process of calculating and assigning the data timeslot is identical to the processes from Steps S41 to S46 in the sequence of processes illustrated in FIG. 10 according to the second embodiment. Moreover, the process of calculating and assigning the photon timeslot is identical to the processes from Steps S41 to S45 and Step S47 in the sequence of processes illustrated in FIG. 10. Herein, at Step S44, the calculator 29 can calculate the photon timeslot instead of calculating the data timeslot. Alternatively, the calculator 29 can calculate both the data timeslot and the photon timeslot at Step S44.

Figure 12:
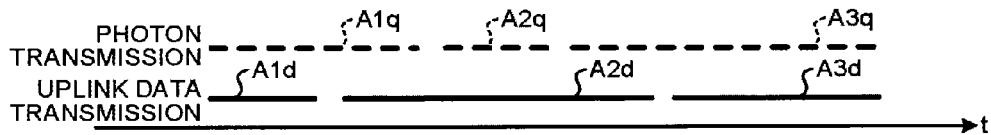
FIG. 12 is a diagram illustrating an example of the traffic flow according to a third embodiment.

FIG. 12 is a diagram illustrating an example of the traffic flow according to the third embodiment. Firstly, for example, in the transmitter 1$a$, a case is assumed in which the QAN information indicates that the number of cryptographic keys stored due to transmission of photons is small and the PON information indicates that the volume of the stored uplink data is small. In this case, since the volume of the stored uplink data is small, the calculator 29 shortens the data timeslot A1$d$ assigned to the transmitter is in the uplink-direction optical data communication channel 32 (see FIG. 12). Moreover, since the number of cryptographic keys is small thereby leaving a possibility of future shortage of cryptographic keys, the calculator 29 elongates the photon timeslot A1$q$ assigned to the transmitter 1$a$ in the photon communication channel 30 (see FIG. 12).

Meanwhile, for example, in the transmitter 1$b$, a case is assumed in which the QAN information indicates that the number of stored cryptographic keys is sufficient and the PON information indicates that the volume of uplink data which need not be encoded is large. In this case, since the volume of uplink data which need not be encoded is large, the calculator 29 elongates the data timeslot A2$d$, which is assigned to the transmitter 1$b$ in the uplink-direction optical data communication channel, regardless of the number of stored cryptographic keys (see FIG. 12). Moreover, since the number of stored cryptographic keys is sufficient and since the volume of uplink data which requires encryption is small, the calculator 29 shortens the photon timeslot A2$q$ assigned to the transmitter 1$b$ in the photon communication channel 30 (see FIG. 12). Meanwhile, in the example illustrated in FIG. 12, due to the reasons explained above, the photon timeslot A3$q$ assigned to the transmitter 1$c$ is set to be longer than the data timeslot A3$d$ assigned to the transmitter 1$c$.

As described above, in the communication system according to the third embodiment, the receiver 2 calculates the data timeslots and the photon timeslots based on the PON information as well as the QAN information. As a result, it becomes possible to individually optimize each timeslot (the data timeslots and the photon timeslots).

In the communication system 100$a$ illustrated in FIG. 2 that has an identical configuration to the communication system according to the third embodiment, it is assumed that all links between the receiver 2 and each transmitter 1 include a photon communication channel, a downlink-direction optical data communication channel, and an uplink-direction optical data communication channel. However, that is not the only possible case. Alternatively, in the third embodiment, at least two or more of the links can be configured to include the three channels mentioned above.

Moreover, in the communication system 100$a$ illustrated in FIG. 2 that has an identical configuration to the communication system according to the third embodiment, it is assumed that the photon communication channel, the downlink-direction optical data communication channel, and the uplink-direction optical data communication channel are formed in the same optical fiber link. However, that is not the only possible case. Alternatively, in the third embodiment, each of the three channels can be formed in a separate optical fiber link or some of the channels can be formed in the same optical fiber link. However, forming all three channels in the same optical fiber link enables achieving reduction in the cost of laying the optical fiber.

Fourth Embodiment

The processes performed in a communication system according to a fourth embodiment are explained with a focus on the differences in the configuration and processes with the communication system 100$a$ according to the first embodiment. Herein, the configuration of the communication system according to the fourth embodiment as well as the block configuration of the transmitters 1 and the receiver 2 is identical to the first embodiment. Moreover, the quantum key distribution and the key distillation process performed in the communication system according to the fourth embodiment are identical to the first embodiment.

In the communication system according to the fourth embodiment, it is assumed that at least the photon communication channel 30 and the uplink-direction optical data communication channel 32 are formed in the same optical fiber link. Herein, although these channels are subjected to wavelength multiplexing with different wavelengths by implementing the WDM technology, the optical intensity of the data transmitted through the uplink-direction optical data communication channel 32 is extremely high as compared to the optical intensity of the photons transmitted through the photon communication channel. For that reason, there are times when the transmission of data in the uplink-direction optical data communication channel 32 appears as an error in the photon communication channel 30. In the fourth embodiment, the explanation is given about a communication system that enables suppression of the effect of data transmission in the uplink-direction optical data communication channel 32 on the photon transmission in the photon communication channel 30.

Figure 13:
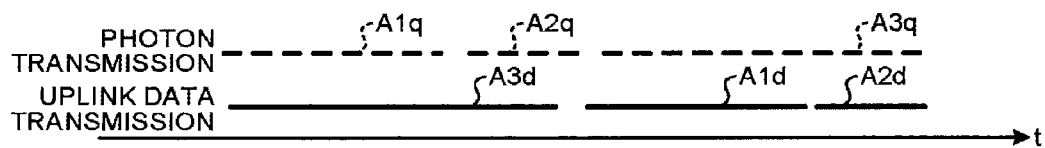
FIG. 13 is a diagram illustrating an example of the traffic flow according to a fourth embodiment.

FIG. 13 is a diagram illustrating an example of the traffic flow according to the fourth embodiment. Thus, with reference to FIG. 13, the explanation is given about the processes for calculating and assigning timeslots in the communication system according to the fourth embodiment.

In the fourth embodiment, the calculation and the assignment of the data timeslots and the photon timeslots (particularly, the transmission start period) can be done according to the method explained with reference to any one of FIGS. 5, 9, and 10. However, the calculator 29 of the receiver 2 calculates the transmission start timings of the data timeslots and the photon timeslots in such a way that, as illustrated in FIG. 13, the timing of using the uplink-direction optical data communication channel 32 and the timing of using the photon communication channel 30 in the same transmitter 1 do not overlap with each other. As a specific example, with reference to FIG. 13, the photon timeslot A1$q$ and the data timeslot A1$d$ of the transmitter 1$a$ are set in non-overlapping time periods. Similarly, the photon timeslot A2$q$ and the data timeslot A2$d$ of the transmitter 1$b$ are set in non-overlapping time periods. Moreover, the photon timeslot A3$q$ and the data timeslot A3$d$ of the transmitter is are set in non-overlapping time periods.

As described above, in the fourth embodiment, the time period for the photon timeslot and the time period for the data timeslot in the same transmitter are set not to overlap each other. As a result, at least from each transmitter 1 to the optical device 4, within the photon timeslot assigned to the corresponding transmitter 1 in the photon communication channel 30, it becomes possible to prevent the occurrence of the noise attributed to the data transmission using the uplink-direction optical data communication channel 32. That results in a decrease in the noise occurring at the time of sharing cryptographic keys between the transmitters 1 and the receiver 2, thereby enabling achieving enhancement in the efficiency while sharing the cryptographic keys.

Fifth Embodiment

The processes performed in a communication system according to a fifth embodiment are explained with a focus on the differences in the configuration and processes with the communication system 100a according to the first embodiment. Herein, the configuration of the communication system according to the fifth embodiment as well as the block configuration of the transmitters 1 and the receiver 2 is identical to the first embodiment. Moreover, the quantum key distribution and the key distillation process performed in the communication system according to the fifth embodiment are identical to the first embodiment.

In the communication system according to the fifth embodiment, it is assumed that at least the photon communication channel 30 and the uplink-direction optical data communication channel 32 are formed in the same optical fiber link. Herein, although these channels are subjected to wavelength multiplexing with different wavelengths by implementing the WDM technology, the optical intensity of the data transmitted through the uplink-direction optical data communication channel 32 is extremely high as compared to the optical intensity of the photons transmitted through the photon communication channel. In that regard, in the fourth embodiment, the time period for the photon timeslot and the time period for the data timeslot in the same transmitter 1 are set not to overlap with each other. As a result, at least from each transmitter 1 to the optical device 4, within the photon timeslot assigned to the corresponding transmitter 1 in the photon communication channel 30, it becomes possible to prevent the occurrence of the noise attributed to the data transmission using the uplink-direction optical data communication channel 32. In comparison, in the fifth embodiment, the explanation is given for a communication system in which, from each transmitter 1 to the receiver 2, within the photon timeslot assigned to the corresponding transmitter 1 in the photon communication channel 30, the noise attributed to the data transmission using the uplink-direction optical data communication channel 32 is prevented from occurring.

Figure 14:
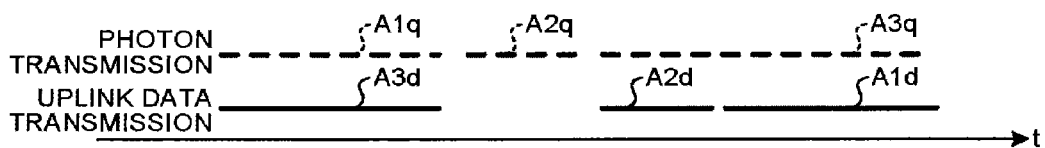
FIG. 14 is a diagram illustrating an example of the traffic flow according to a fifth embodiment.
Figure 15:
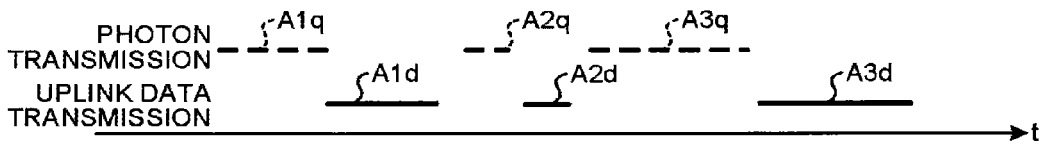
FIG. 15 is a diagram illustrating an example of the traffic flow according to a modification example of the fifth embodiment.

FIG. 14 is a diagram illustrating an example of the traffic flow according to the fifth embodiment. FIG. 15 is a diagram illustrating an example of the traffic flow according to a modification example of the fifth embodiment. Thus, with reference to FIGS. 14 and 15, the explanation is given about the processes for calculating and assigning timeslots in the communication system according to the fifth embodiment.

In the fifth embodiment, the calculation and the assignment of the data timeslots and the photon timeslots (particularly, the transmission start period) can be done according to the method explained with reference to any one of FIGS. 5, 9, and 10. However, the calculator 29 of the receiver 2 calculates the transmission start timings of the data timeslots and the photon timeslots in such a way that, as illustrated in FIG. 13, the timing of using the uplink-direction optical data communication channel 32 and the timing of using the photon communication channel 30 in the same transmitter 1 do not overlap with each other. Herein, for example, assume that, in the transmitter 1b, the error of the photon communication channel 30 is particularly large. For example, it can be assumed that the photon communication controller 27 of the receiver 2 measures the error rate of the photon communication channel 30 and determines that the transmitter 1 for which the error rate exceeds a threshold value is the transmitter having a large error. In this case, the calculator 29 further calculates the data timeslots and the photon timeslots in such a way that, as illustrated in FIG. 14, none of the transmitters 1 use the uplink-direction optical data communication channel 32 while the transmitter 1b is using the photon communication channel 30. As a result, from the transmitter 1b to the receiver 2, within the photon timeslot assigned to the transmitter 1b in the photon communication channel 30, it becomes possible to prevent the occurrence of the noise attributed to the data transmission performed by the transmitters 1 using the uplink-direction optical data communication channel 32. That results in a decrease in the noise occurring at the time of sharing cryptographic keys between the transmitter 1b and the receiver 2, thereby enabling achieving enhancement in the efficiency while sharing the cryptographic keys.

In FIG. 15 is illustrated an example in which the calculator 29 calculates the data timeslots and the photon timeslots in such a way that none of the transmitters 1 use the uplink-direction optical data communication channel 32 while each transmitter 1 is using the photon communication channel 30. As a result, from each transmitter 1 to the receiver 2, within the photon timeslot assigned to that transmitter 1 in the photon communication channel 30, it becomes possible to prevent the occurrence of the noise attributed to the data transmission performed by all transmitters 1 using the uplink-direction optical data communication channel 32. That results in a decrease in the noise occurring at the time of sharing cryptographic keys between each transmitter 1 and the receiver 2, thereby enabling achieving enhancement in the efficiency while sharing the cryptographic keys.

Meanwhile, in each embodiment described above, the timing of changing the photon timeslot assigned to each transmitter 1 in the photon communication channel 30 may be different from the timing of changing the data timeslot assigned to that transmitter 1 in the uplink-direction optical data communication channel 32. For example, in FIG. 11 is illustrated the example in which the data timeslot assigned to each transmitter 1 matches with the photon timeslot assigned to that transmitter 1. However, in practice, regarding the timings at which the timeslots calculated by the calculator 29 are assigned; for example, the data timeslots in the uplink-direction optical data communication channel 32 can be changed instantly, but the photon timeslots in the photon communication channel 30 can be changed after a predetermined time delay.

Moreover, in each embodiment described above, the time of applying the photon timeslot assigned to each transmitter 1 in the photon communication channel 30 may be different from the time of applying the data timeslot assigned to that transmitter 1 in the uplink-direction optical data communication channel 32. For example, based on the volume of the stored uplink data, the data timeslot in the uplink-direction optical data communication channel 32 is changed on a frequent basis. However, regarding the photon communication channel 30, changing the photon timeslot on a frequent basis is not desirable from the perspective of stable processes of the photon transmission laser. For that reason, the frequency of changing to the assigned photon timeslot can be set to be smaller than the frequency of changing to the assigned data timeslot. More particularly, the configuration can be such that, after the GATE frame for changing the data timeslot is transmitted for 1000 times, the GATE frame for changing the photon timeslot is transmitted once.

Meanwhile, it is possible to think of a case in which each transmitter 1 transmits a photon bit string either in units of photon blocks each made of a plurality of photons (for example, 2000 photon) or in units of single photons. In such a case, the photon timeslot for each transmitter 1 in the photon communication channel 30 is assigned according to the number of photons transmitted during each transmission.

Figure 16:
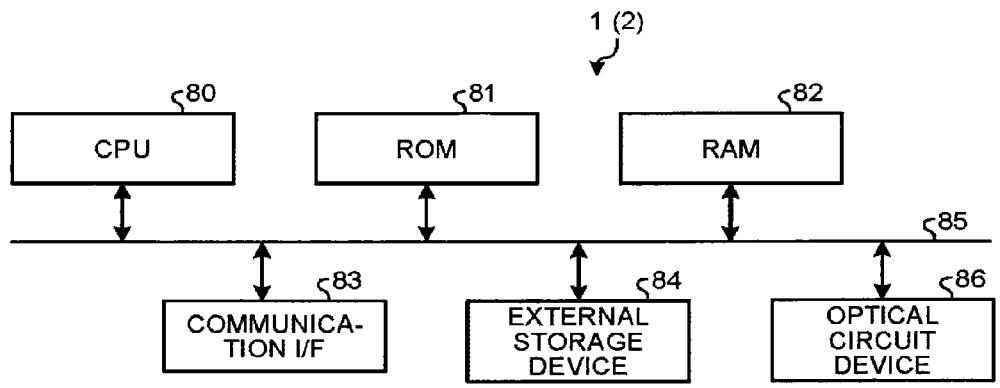
FIG. 16 is a diagram illustrating an exemplary hardware configuration of the transmitter and the receiver.

FIG. 16 is a diagram illustrating an exemplary hardware configuration of the transmitters and the receiver. Thus, a hardware configuration of the communication device according to the embodiments described above is explained below with reference to FIG. 16.

The communication device according to the embodiments includes a control device such as the CPU 80; a read only memory (ROM) 81; a random access memory (RAM) 82; a first communication I/F 83 that performs photon transmission and photon reception as well as performs optical data communication; an external storage device 84 that serves as the storage for storing cryptographic keys; and a bus 85 that connects the constituent elements to each other. Moreover, an optical circuit device 86 is also disposed for implementing some of the functions of quantum key distribution, and can be connected to the bus 85.

The computer programs executed in the communication device according to the embodiments are stored in advance in the ROM 81.

Alternatively, the computer programs executed in the communication device according to the embodiments can be recorded as installable or executable files in a computer-readable recording medium such as a compact disk read only memory (CD-ROM), a flexible disk (FD), a compact disk recordable (CD-R), or a digital versatile disk (DVD); and can be provided in the form of a computer program product.

Still alternatively, the computer programs executed in the communication device according to the embodiments can be saved as downloadable files on a computer connected to the Internet or can be made available for distribution through a network such as the Internet.

The computer programs executed in the communication device according to the embodiments can cause a computer to function as the constituent elements of the communication device (i.e., function as the optical fiber link connecting unit 10, the quantum key sharing unit 11, the key distilling unit 12, the key managing/providing unit 13, the synchronization controller 16, the photon communication controller 17, the optical data communication controller 18, the optical fiber link connecting unit 20, the quantum key sharing unit 21, the key distilling unit 22, the key managing/providing unit 23, the synchronization controller 26, the photon communication controller 27, the optical data communication controller 28, and the calculator 29). In this computer, the CPU 80 can read the computer programs from a computer-readable memory medium, load them into a main storage device, and execute them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A receiver connected to a plurality of transmitters through photon communication channels and data communication channels to generate cryptographic keys for the respective transmitters such that an identical cryptographic key is shared with the receiver and the concerned transmitter, the photon communication channels being used for receiving photon strings by time-division multiplexing performed using photon timeslots, the data communication channels being used for performing data communication, the receiver comprising:
   a first quantum key sharing unit configured to generate a shared bit string through quantum key distribution with each of the transmitters via a corresponding photon communication channel;
   a first key distilling unit configured to generate the cryptographic keys from the respective shared bit strings by a key distillation process;
   a first data communication controller configured to receive from each of the respective transmitters first information indicating information about the corresponding cryptographic key of the respective transmitter via the corresponding data communication channel; and
   a calculator configured to calculate the photon timeslots based on at least the first information, wherein
   the first data communication controller is configured to transmit the photon timeslots calculated by the calculator to the transmitters.

2. The receiver according to claim 1, wherein
   the first data communication controller is configured to
      receive data from each of the transmitters via the corresponding data communication channel by time-division multiplexing performed using data timeslots,
      receive from each of the transmitters via the corresponding data communication channel second information indicating a volume of data to be transmitted by the each of the transmitters,
   the calculator is configured to calculate the data timeslots based on at least the second information, and
   the first data communication controller is configured to transmit the data timeslots calculated by the calculator to the each of the transmitters.

3. The receiver according to claim 2, wherein the calculator is configured to calculate the photon timeslot and the data timeslot that are identical to each other based on at least the first information and the second information.

4. The receiver according to claim 1, wherein the first information contains a number of cryptographic keys that are stored.

5. The receiver according to claim 2, wherein the first information contains information about a volume of data that requires encryption out of the volume of data transmitted by the each of the transmitters.

6. The receiver according to claim 2, wherein the calculator is configured to individually calculate the photon timeslots and the data timeslots based on at least the first information and the second information.

7. The receiver according to claim 2, wherein
the photon communication channel and the data communication channel for each of the transmitters are formed in a same optical communication path, and
the calculator is configured to calculate, for each of the transmitters, the photon timeslot and the data timeslot such that a period of time represented by the photon timeslot and a period of time represented by the data timeslot do not overlap.

8. The receiver according to claim 2, further comprising a first photon communication controller configured to measure an error rate in the photon communication channel for each of the transmitters, and determine whether or not the error rate exceeds a predetermined threshold value, wherein
the photon communication channel and the data communication channel for each of the transmitters are formed in a same optical communication path, and
the calculator is configured to calculate the photon timeslots and the data timeslots such that a period of time represented by the photon timeslot of the transmitter for which the first photon communication controller determines that the error rate is exceeding the threshold value in the photon communication channel does not overlap with a period of time represented by the data timeslots of all of the transmitters.

9. The receiver according to claim 2, further comprising a first photon communication controller configured to measure an error rate in the photon communication channel for each of the transmitters, and determine whether or not the error rate exceeds a predetermined threshold value, wherein
the photon communication channel and the data communication channel for each of the transmitters are formed in a same optical communication path, and
the calculator is configured to calculate the photon timeslots and the data timeslots such that a period of time represented by the photon timeslot of each of the transmitters does not overlap with a period of time represented by the data timeslots of all of the transmitters.

10. A transmitter connected to a receiver through a photon communication channel and a data communication channel to generate an identical cryptographic key with the receiver and share the cryptographic key with the receiver, the photon communication channel being used for sending photon strings by time-division multiplexing performed using photon timeslots, the data communication channel being used for performing data communication, the transmitter comprising:
a second quantum key sharing unit configured to generate a shared bit string through quantum key distribution with the receiver via the photon communication channel;
a second key distilling unit configured to generate the cryptographic key from the shared bit string by a key distillation process;
a second data communication controller configured to transmit first information indicating information about the cryptographic key to the receiver via the data communication channel; and
a second photon communication controller configured to receive a photon timeslot of the photon timeslots calculated by the receiver based on at least the first information, and transmit the photon string to the receiver via the photon communication channel according to the photon timeslot.

11. The transmitter according to claim 10, wherein the second data communication controller is configured to transmit, to the receiver via the data communication channel, second information indicating a volume of data to be transmitted,
receive a data timeslot calculated by the receiver based on at least the second information, and
transmit data to the receiver via the data communication channel by time-division multiplexing using the data timeslot calculated by the receiver.

12. The transmitter according to claim 10, wherein the first information contains a number of cryptographic keys that are stored.

13. The transmitter according to claim 11, wherein the first information contains information about a volume of data that requires encryption out of the volume of data transmitted to the receiver.

14. A communication system comprising:
the receiver according to claim 1; and
the transmitters each including
a second quantum key sharing unit configured to generate the shared bit string through quantum key distribution with the receiver via the photon communication channel;
a second key distilling unit configured to generate the cryptographic key from the shared bit string by the key distillation process;
a second data communication controller configured to transmit the first information indicating the information about the cryptographic key to the receiver via the data communication channel; and
a second photon communication controller configured to receive the photon timeslot calculated by the receiver based on at least the first information, and transmit the photon string to the receiver via the photon communication channel according to the photon timeslot.

15. A communication method implemented in a communication system in which a receiver is connected to a plurality of transmitters through photon communication channels and data communication channels to generate an identical cryptographic key shared with the receiver and the concerned transmitter, the photon communication channels being used for receiving photon strings by time-division multiplexing performed using photon timeslots, the data communication channels being used for performing data communication, the communication method comprising:
generating respective shared bit strings through quantum key distribution between the receiver and the respective transmitters via the corresponding photon communication channels;
generating, in the receiver and the transmitters, the cryptographic keys from the shared bit strings by a key distillation process;
transmitting, from each of the transmitters to the receiver via a corresponding data communication channel, first information indicating info' ration about the corresponding cryptographic key;
calculating the photon timeslots based on at least the first information;
transmitting, from the receiver to each of the transmitters, the calculated corresponding photon timeslot; and
transmitting from each of the transmitters to the receiver, the corresponding photon string via the corresponding photon communication channel according to the calculated corresponding photon timeslot.

* * * * *